US009837655B2

(12) United States Patent
Park et al.

(10) Patent No.: US 9,837,655 B2
(45) Date of Patent: Dec. 5, 2017

(54) RECHARGEABLE BATTERY PACK

(71) Applicant: SAMSUNG SDI CO., LTD., Yongin-si, Gyeonggi-do (KR)

(72) Inventors: Insoo Park, Yongin-si (KR); Daeyon Moon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 61 days.

(21) Appl. No.: 14/720,488

(22) Filed: May 22, 2015

(65) Prior Publication Data

US 2016/0172648 A1    Jun. 16, 2016

(30) Foreign Application Priority Data

Dec. 11, 2014    (KR) ........................ 10-2014-0178709

(51) Int. Cl.
*H01M 2/10*    (2006.01)
*H01M 2/20*    (2006.01)
(Continued)

(52) U.S. Cl.
CPC ......... *H01M 2/204* (2013.01); *H01M 2/1061* (2013.01); *H01M 2/22* (2013.01);
(Continued)

(58) Field of Classification Search
CPC ...... H01M 2/202; H01M 2/204; H01M 2/206; H01M 2/1061; H01M 2/22; H01M 2/30;
(Continued)

(56) References Cited

U.S. PATENT DOCUMENTS

| 6,521,363 B1* | 2/2003 | Yeh ........................ H01M 2/204 307/150 |
| 2010/0159289 A1* | 6/2010 | Kim .................... H01M 2/0404 429/7 |

(Continued)

FOREIGN PATENT DOCUMENTS

| JP | 10-027599 A | 1/1998 |
| JP | 2003-217557 | 7/2003 |

(Continued)

OTHER PUBLICATIONS

English machine translation of Japanese Publication No. JP 10-027599 A, dated Jan. 27, 1998, 9 pages.

(Continued)

*Primary Examiner* — Eugenia Wang
(74) *Attorney, Agent, or Firm* — Lewis Roca Rothgerber Christie LLP (57) ABSTRACT

A rechargeable battery pack includes a first rechargeable battery including a first electrode terminal and a first contact part that are on a first upper surface of the first rechargeable battery; a second rechargeable battery including a second electrode terminal and a second contact part that are on a second upper surface of the second rechargeable battery; a first coverlay connected to the first contact part; a second coverlay connected to the second electrode terminal; and a connection part connecting the first electrode terminal and the second contact part. The connection part includes a first part connected to the first electrode terminal and a second part connected to the second contact part. The first upper surface of the first rechargeable battery and the second upper surface of the second rechargeable battery face each other. The connection part is bent such that the first and second parts face each other.

18 Claims, 5 Drawing Sheets

(51) Int. Cl.
  *H01M 2/22* (2006.01)
  *H01M 2/30* (2006.01)
  *H01M 10/42* (2006.01)
  *H01M 2/34* (2006.01)

(52) U.S. Cl.
  CPC .......... *H01M 2/30* (2013.01); *H01M 10/425* (2013.01); *H01M 2/348* (2013.01); *H01M 2220/30* (2013.01)

(58) Field of Classification Search
  CPC . H01M 2/348; H01M 10/425; H01M 2220/30
  See application file for complete search history.

(56) References Cited

U.S. PATENT DOCUMENTS

| | | | |
|---|---|---|---|
| 2011/0117412 A1* | 5/2011 | Park | H01M 2/202 429/121 |
| 2011/0236728 A1 | 9/2011 | Uchida et al. | |
| 2014/0004392 A1* | 1/2014 | Sung | H01M 2/20 429/7 |

FOREIGN PATENT DOCUMENTS

| | | | |
|---|---|---|---|
| JP | 2004-119043 | 4/2004 | |
| JP | 2006-040775 A | 2/2006 | |
| JP | 2009-043462 | 2/2009 | |
| JP | 2011-222484 A | 11/2011 | |
| KR | 10-2011-0094415 | 8/2011 | |
| KR | WO 2012169832 A2 * | 12/2012 | ............. H01M 2/20 |

OTHER PUBLICATIONS

English machine translation of Japanese Publication No. JP 2006-040775 A, dated Feb. 9, 2006, 6 pages.
English machine translation of Japanese Publication 2003-217557 dated Jul. 31, 2003, listed above, (5 pages).
English machine translation of Japanese Publication 2004-119043 dated Apr. 15, 2004, listed above, (28 pages).
English machine translation of Japanese Publication 2009-043462 dated Feb. 26, 2009, listed above, (19 pages).

* cited by examiner

RECHARGEABLE BATTERY PACK

CROSS-REFERENCE TO RELATED APPLICATION

This application claims priority to and the benefit of Korean Patent Application No. 10-2014-0178709, filed on Dec. 11, 2014, in the Korean Intellectual Property Office, the disclosure of which is incorporated herein in its entirety by reference.

BACKGROUND

1. Field

One or more exemplary embodiments relate to a rechargeable battery pack.

2. Description of the Related Art

Along with the development of the wireless Internet and communication techniques, the use of cellular phones and portable computers, which may operate by using batteries and without being connected to a fixed power source, has become widespread. As cellular phones or portable computers are relatively small, easy-to-carry, and designed for mobile use, they are widely employed for business and personal use.

Cellular phones equipped with rechargeable batteries may be used anywhere without being limited to locations where power outlets are available, and portable computers equipped with external/internal rechargeable battery packs may be used anywhere without being limited to locations where power outlets are available. An external/internal rechargeable battery pack may include a plurality of rechargeable batteries which can be repeatedly charged and discharged. Such rechargeable batteries may be connected in series and/or parallel without the occurrence of a short circuit therebetween.

SUMMARY

One or more aspects of one or more exemplary embodiments are directed toward a rechargeable battery pack in which rechargeable batteries are connected to each other through a simple structure.

Additional aspects will be set forth in part in the description which follows and, in part, will be apparent from the description, or may be learned by practice of the presented embodiments.

According to one or more exemplary embodiments, a rechargeable battery pack includes: a first rechargeable battery including a first electrode terminal and a first contact part that are provided on a first upper surface of the first rechargeable battery; a second rechargeable battery including a second electrode terminal and a second contact part that are provided on a second upper surface of the second rechargeable battery; a first coverlay connected to the first contact part; a second coverlay connected to the second electrode terminal; and a connection part connecting the first electrode terminal and the second contact part, wherein the connection part includes a first part connected to the first electrode terminal and a second part connected to the second contact part, the first upper surface of the first rechargeable battery and the second upper surface of the second rechargeable battery face each other, and the connection part is bent such that the first and second parts face each other.

The connection part may include a bending region along a boundary between the first and second parts.

The bending region may include a groove formed along the boundary between the first and second parts.

Each of the first and second rechargeable batteries may include: an electrode assembly including a first electrode plate, a second electrode plate, and a separator between the first and second electrode plates; a can accommodating the electrode assembly and including an opening formed in a side thereof; and a cap plate sealing the opening of the can, and the cap plate may form the first or second upper surface.

A piece of insulation tape may be attached to the cap plate in such a manner that the first or second contact part may be exposed.

The first rechargeable battery may include a pair of first main surfaces and a pair of first lateral surfaces that are substantially perpendicular to the first upper surface, the pair of first main surfaces may be substantially parallel to each other, areas of the pair of first lateral surfaces may be smaller than areas of the pair of first main surfaces, and the pair of first lateral surfaces may connect the pair of first main surfaces. The second rechargeable battery may include a pair of second main surfaces and a pair of second lateral surfaces that are substantially perpendicular to the second upper surface, the pair of second main surfaces may be substantially parallel to each other, areas of the pair of second lateral surfaces may be smaller than areas of the pair of second main surfaces, and the pair of second lateral surfaces connect the pair of second main surfaces.

The first coverlay may include a first lead terminal disposed on the first upper surface and a first extension bent at a right angle from the first lead terminal and disposed on one of the pair of first lateral surfaces, and the second coverlay may include a second lead terminal disposed on the second upper surface and a second extension bent at a right angle from the second lead terminal and disposed on one of the pair of second lateral surfaces.

A first connection terminal may protrude from the first extension, and a second connection terminal may protrude from the second extension.

The rechargeable battery pack may further include a protective circuit module connected to the first connection terminal and the second connection terminal, and the protective circuit module may be substantially parallel with the pair of first lateral surfaces and the pair of second lateral surfaces.

The second electrode terminal and the second lead terminal may be electrically connected to each other through a thermal protection device.

According to one or more exemplary embodiments, a rechargeable battery pack includes: a first rechargeable battery including a first electrode terminal and a first contact part that are provided on a first upper surface of the first rechargeable battery; a second rechargeable battery including a second electrode terminal and a second contact part that are provided on a second upper surface of the second rechargeable battery; a first coverlay connected to the first contact part; a second coverlay connected to the second electrode terminal; a connection part connecting the first electrode terminal and the second contact part; and a protective circuit module connected to the first coverlay and the second coverlay, wherein the connection part is bent along a bending region formed in a direction substantially parallel to a length direction of the first and second upper surfaces.

The connection part may include first and second parts on both sides of the bending region, and the first part may be connected to the first electrode terminal, the second part may be connected to the second contact part, and the first and second parts may face each other.

Each of the first and second rechargeable batteries may include: an electrode assembly including a first electrode plate, a second electrode plate, and a separator between the first and second electrode plates; a can accommodating the electrode assembly and including an opening formed in a side thereof; and a cap plate sealing the opening of the can, and the cap plate may form the first or second upper surface.

The first rechargeable battery may include a pair of first main surfaces and a pair of first lateral surfaces that are substantially perpendicular to the first upper surface, the pair of first main surfaces may be substantially parallel to each other, areas of the pair of first lateral surfaces may be smaller than areas of the pair of first main surfaces, and the pair of first lateral surfaces connect the pair of first main surfaces, and the first coverlay may include a first lead terminal disposed on the first upper surface and a first extension bent at a right angle from the first lead terminal and disposed on one of the pair of first lateral surfaces.

The second rechargeable battery may include a pair of second main surfaces and a pair of second lateral surfaces that are substantially perpendicular to the second upper surface, the pair of second main surfaces may be substantially parallel to each other, areas of the pair of second lateral surfaces may be smaller than areas of the pair of second main surfaces, and the pair of second lateral surfaces may connect the pair of second main surfaces, and the second coverlay may include a second lead terminal disposed on the second upper surface and a second extension bent at a right angle from the second lead terminal and disposed on one of the pair of second lateral surfaces.

A first connection terminal may protrude from the first extension, and a second connection terminal may protrude from the second extension, and the protective circuit module may be connected to the first connection terminal and the second connection terminal.

The second electrode terminal and the second lead terminal may be electrically connected to each other through a thermal protection device.

The first upper surface of the first rechargeable battery and the second upper surface of the second rechargeable battery may face each other, and the protective circuit module may be substantially parallel with the pair of first lateral surfaces and the pair of second lateral surfaces.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to exemplary embodiments, examples of which are illustrated in the accompanying drawings. Effects and features of the exemplary embodiments, and implementation methods thereof will be clarified through the following descriptions given with reference to the accompanying drawings. In this regard, the exemplary embodiments may have different forms and should not be construed as being limited to the descriptions set forth herein. As used herein, the term "and/or" includes any and all combinations of one or more of the associated listed items. Expressions such as "at least one of," when preceding a list of elements, modify the entire list of elements and do not modify the individual elements of the list.

Hereinafter, the exemplary embodiments will be described in more detail with reference to the accompanying drawings. In the drawings, like reference numerals denote like elements, and overlapping descriptions thereof will be omitted.

In the following descriptions of the exemplary embodiments, although the terms "first" and "second" are used to describe various elements, these elements should not be limited by these terms. These terms are only used to distinguish one element from another element.

In the following descriptions of the exemplary embodiments, the terms of a singular form may include plural forms unless referred to the contrary.

In the following descriptions of the exemplary embodiments, the meaning of "include," "comprise," "including," or "comprising" specifies a property, a region, a fixed number, a step, a process, an element, a component, and a combination thereof but does not exclude other properties, regions, fixed numbers, steps, processes, elements, components, and combinations thereof. Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present. Also, the term "exemplary" is intended to refer to an example or illustration. It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present.

As used herein, the term "substantially," "about," and similar terms are used as terms of approximation and not as terms of degree, and are intended to account for the inherent deviations in measured or calculated values that would be recognized by those of ordinary skill in the art. As used herein, the terms "use," "using," and "used" may be considered synonymous with the terms "utilize," "utilizing," and "utilized," respectively.

In the drawings, the sizes of elements may be exaggerated for clarity. For example, in the drawings, the size or thickness of each element may be arbitrarily shown for illustrative purposes, and thus the inventive concept should not be construed as being limited thereto.

Figure 1:
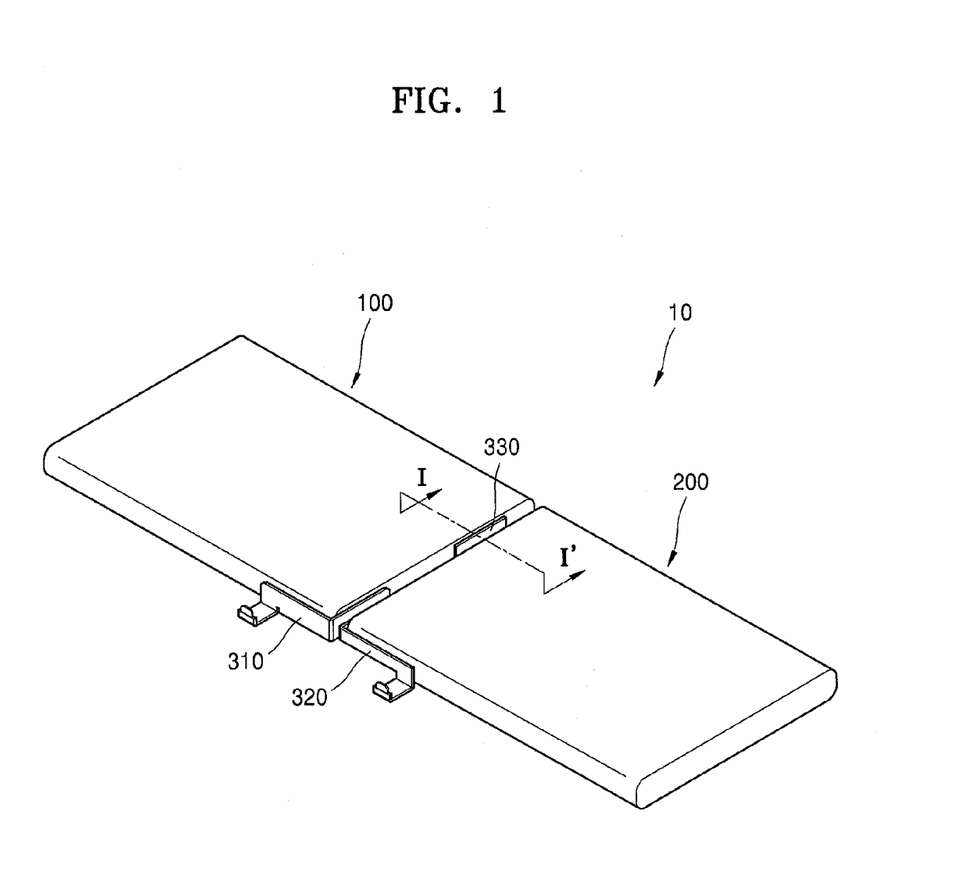
FIG. 1 illustrates a perspective view of a rechargeable battery pack according to an exemplary embodiment.
Figure 2:
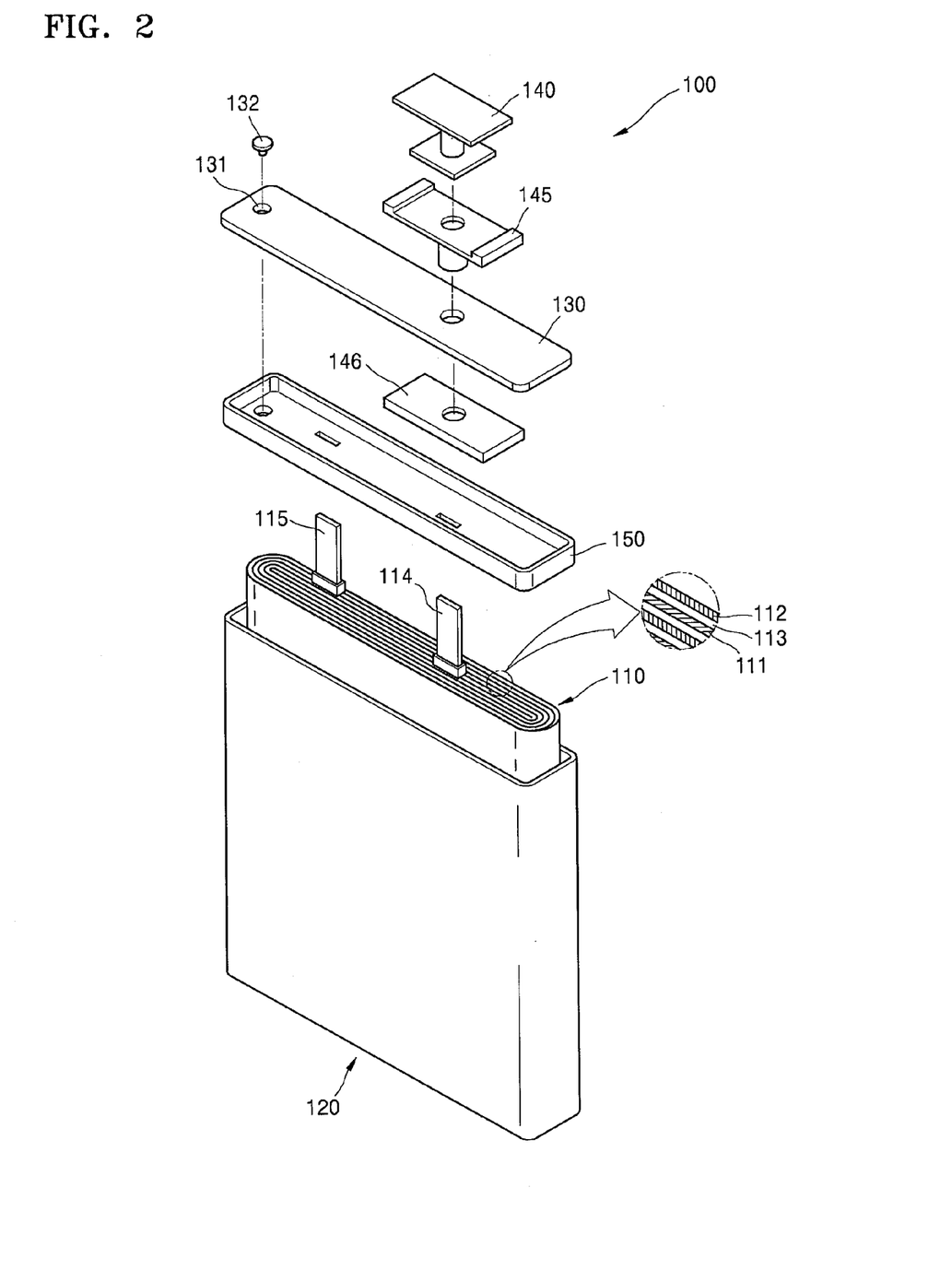
FIG. 2 illustrates an exploded perspective view of a rechargeable battery of the rechargeable battery pack illustrated in FIG. 1.
Figure 3:
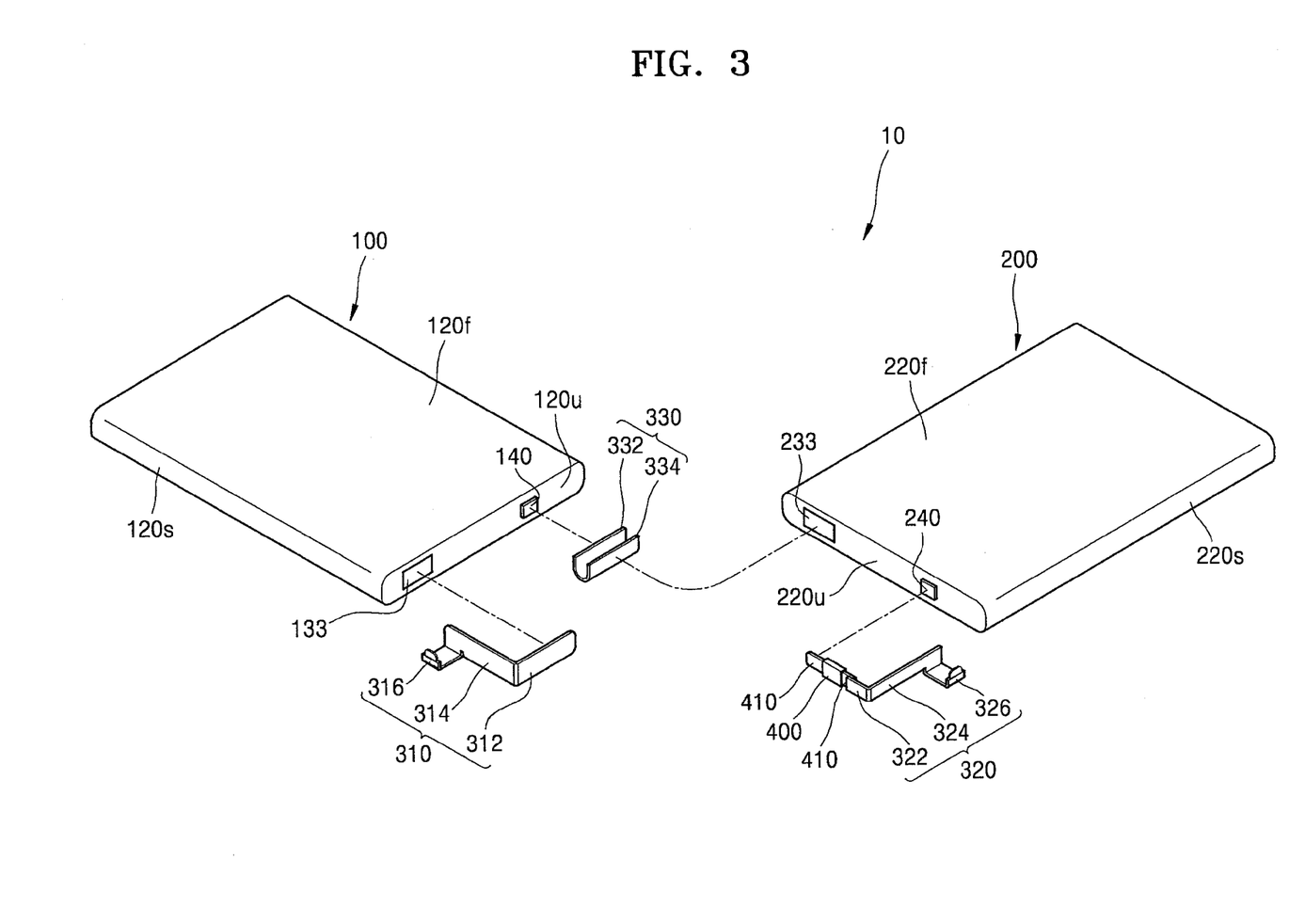
FIG. 3 illustrates an exploded perspective view of the rechargeable battery pack illustrated in FIG. 1.
Figure 4:
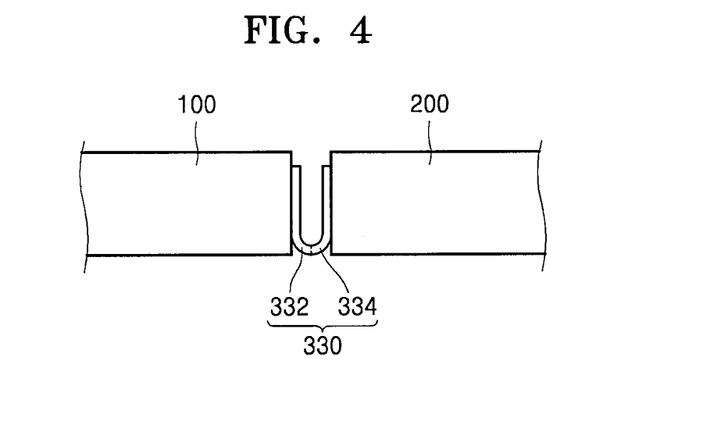
FIG. 4 illustrates a schematic cross-sectional view taken along line I-I' of FIG. 1.
Figure 5:
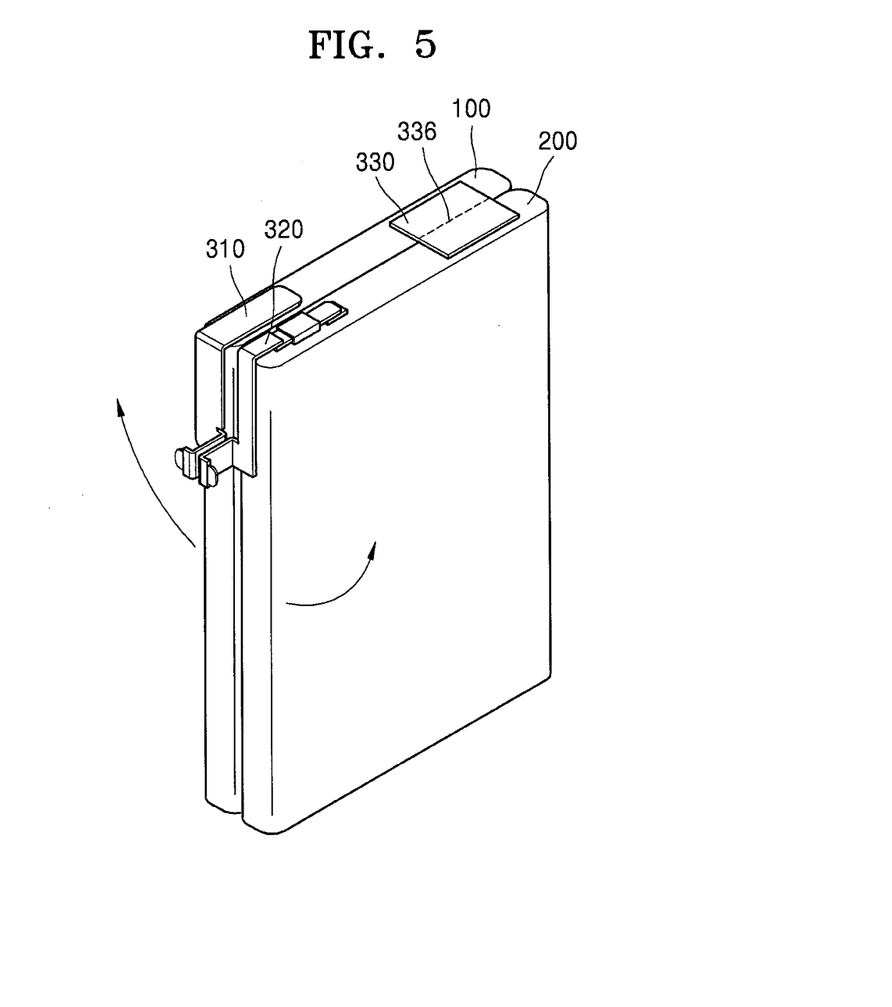
FIG. 5 illustrates a perspective view for describing a method of manufacturing the rechargeable battery pack illustrated in FIG. 1.

FIG. 1 is a perspective view schematically illustrating a rechargeable battery pack 10 according to an exemplary embodiment; FIG. 2 is an exploded perspective view schematically illustrating a rechargeable battery of the rechargeable battery pack 10 illustrated in FIG. 1; FIG. 3 is an exploded perspective view schematically illustrating the rechargeable battery pack 10 illustrated in FIG. 1; FIG. 4 is a schematic cross-sectional view taken along line I-I' of FIG. 1; and FIG. 5 is a perspective view schematically illustrating a method of manufacturing the rechargeable battery pack 10 illustrated in FIG. 1.

Referring to FIGS. 1 to 5, the rechargeable battery pack 10 of the exemplary embodiment may include a first rechargeable battery 100, a second rechargeable battery 200, a first coverlay 310 connected to the first rechargeable battery 100, a second coverlay 320 connected to the second rechargeable battery 200, and a connection part 330 connecting the first and second rechargeable batteries 100 and 200.

The first rechargeable battery 100 may include a first electrode terminal 140 and a first contact part 133 that are formed on a first upper surface 120u of the first rechargeable battery 100. In addition, the first rechargeable battery 100 may include a pair of first main surfaces 120f and a pair of first lateral surfaces 120s that are substantially perpendicular to the first upper surface 120u. The pair of first main surfaces 120f may be substantially parallel to each other. The pair of first lateral surfaces 120s may connect the pair of first main surfaces 120f, and areas of the pair of first lateral surfaces 120s may be smaller than areas of the pair of first main surfaces 120f.

The second rechargeable battery 200 may include a second electrode terminal 240 and a second contact part 233 that are formed on a second upper surface 220u of the second rechargeable battery 200. In addition, the second rechargeable battery 200 may include a pair of second main surfaces 220f and a pair of second lateral surfaces 220s that are substantially perpendicular to the second upper surface 220u. The pair of second main surfaces 220f may be substantially parallel to each other. The pair of second lateral surfaces 220s may connect the pair of second main surfaces 220f, and areas of the pair of second lateral surfaces 220s may be smaller than areas of the pair of second main surfaces 220f.

The first and second rechargeable batteries 100 and 200 may be arranged in such a manner that the first and second upper surfaces 120u and 220u may face each other.

The first rechargeable battery 100 will now be described in more detail with reference to FIG. 2. Although FIG. 2 illustrates the first rechargeable battery 100, the second rechargeable battery 200 may have the same structure as the structure of the first rechargeable battery 100.

The first rechargeable battery 100 may include an electrode assembly 110, a can 120 accommodating the electrode assembly 110, and a cap plate 130 sealing the can 120. The can 120 may form the pair of first main surfaces 120f and the pair of first lateral surfaces 120s, and the cap plate 130 may form the first upper surface 120u.

The electrode assembly 110 may include a first electrode plate 111 to which a first electrode active material is applied, a second electrode plate 112 to which a second electrode active material is applied, and a separator 113 disposed between the first and second electrode plates 111 and 112. The electrode assembly 110 may be formed by sequentially stacking the first electrode plate 111, the separator 113, and the second electrode plate 112, and winding them in the form of a jelly roll.

The first and second electrode plates 111 and 112 are electrically connected to first and second electrode tabs 114 and 115, respectively, so that an electric charge formed by chemical reaction may move outwardly from the first and second electrode plates 111 and 112 through the first and second electrode tabs 114 and 115. The first and second electrode tabs 114 and 115 may extend along the same direction. For example, the first and second electrode tabs 114 and 115 may extend toward the cap plate 130.

In the current embodiment, the electrode assembly 110 has a jelly roll shape. However, the embodiments of the present disclosure are not limited thereto. In other exemplary embodiments, the electrode assembly 110 may have a stacked structure in which first electrode plates 111, separators 113, and second electrode plates 112 are repeatedly stacked.

The can 120 has a hexahedral shape with an opened side. The can 120 may have a lower surface opposite the first upper surface 120u, the first main surfaces 120f, and the first lateral surfaces 120s. The can 120 may include a conductive metallic material. A label may be attached to outer surfaces of the can 120, and an insulation plate may be coupled to the lower surface of the can 120 for insulating the can 120. A piece of insulation tape may be attached to the cap plate 130 in such a manner that the first electrode terminal 140 and the first contact part 133 which is a portion of the cap plate 130 may be exposed to the outside.

The electrode assembly 110 impregnated with an electrolyte may be disposed in the can 120. After the electrode assembly 110 is placed in the can 120, an opening formed in a side of the can 120 may be closed by the cap plate 130. Boundaries between the cap plate 130 and the can 120 may be welded together using a laser for sealing the inside of the can 120.

The cap plate 130 may be formed of the same material as that used for forming the can 120, and an electrolyte inlet 131 may be formed in the cap plate 130. After the cap plate 130 is coupled to the can 120, an electrolyte may be injected into the can 120 through the electrolyte inlet 131, and then the electrolyte inlet 131 may be closed using a plug 132.

The first electrode terminal 140 may be disposed on the cap plate 130. An upper surface of the first electrode terminal 140 may be exposed to the outside, and a lower portion of the first electrode terminal 140 may extend toward the inside of the can 120 through the cap plate 130.

The first electrode terminal 140 may be electrically connected to the first electrode tab 114 of the electrode assembly 110 and may have a first polarity, and the cap plate 130 may be electrically connected to the second electrode tab 115 of the electrode assembly 110 and may have a second polarity. In this case, the can 120 connected to the cap plate 130 by welding may also have the second polarity.

For example, the cap plate 130 function as a positive electrode of the first rechargeable battery 100, and the first electrode terminal 140 may function as a negative electrode of the first rechargeable battery 100. First and second gaskets 145 and 146 including an insulation material may be disposed between the cap plate 130 and the first electrode terminal 140 so as to prevent a short circuit therebetween. The first gasket 145 may make contact with an upper surface of the cap plate 130, and the second gasket 146 may make contact with a lower surface of the cap plate 130. In FIG. 2, the first and second gaskets 145 and 146 are illustrated as separate parts. However, the first and second gaskets 145 and 146 may be formed in one piece.

An insulator 150 may be disposed in the can 120 above the electrode assembly 110. The insulator 150 may insulate the electrode assembly 110 from the cap plate 130. In other embodiments, the insulator 150 may insulate the electrode assembly 110 from the cap plate 130 and prevent the electrode assembly 110 from moving in the can 120. The insulator 150 may include penetration holes to allow the first and second electrode tabs 114 and 115 to extend toward the cap plate 130. In the current exemplary embodiment, the insulator 150 is disposed in the can 120. However, the exemplary embodiments of the present disclosure are not limited thereto. For example, in other exemplary embodiments, the insulator 150 may be used.

The first coverlay 310 may be connected to the first contact part 133. In more detail, the first coverlay 310 may include a first lead terminal 312 welded to the first contact part 133, and a first extension 314 extending from the first lead terminal 312. The first lead terminal 312 may be disposed on the first upper surface 120u. The first extension 314 may be bent at a right angle from the first lead terminal 312 and may be disposed on one of the pair of first lateral surfaces 120s, and a first connection terminal 316 may protrude at or from an end of the first extension 314. The first coverlay 310 may be coated with an insulation film. In this case, however, a portion of the first coverlay 310 corresponding to the first contact part 133, and the first connection terminal 316 of the first coverlay 310 may be exposed for electric connection.

The second coverlay 320 may be electrically connected to the second rechargeable battery 200 and may extend outwardly in the same direction as the direction in which the first coverlay 310 extends outwardly. The second coverlay 320 may include a second lead terminal 322 disposed on the second upper surface 220u; and a second extension 324 bent at a right angle from the second lead terminal 322 and disposed on one of the pair of second lateral surfaces 220s. In addition, a second connection terminal 326 may protrude at or from an end of the second extension 324. The second coverlay 320 may be coated with an insulation film except for the second connection terminal 326 and a portion of the second coverlay 320 electrically connected to the second contact part 233.

The second coverlay 320 may be electrically connected to the second electrode terminal 240 through a thermal protection device 400.

If the temperature of the second rechargeable battery 200 increases to a certain value or higher, the thermal protection device 400 may interrupt a current so as to prevent or protect the second rechargeable battery 200 from catching on fire or exploding. The thermal protection device 400 may reversibly function as a conductor or an insulator according to temperature. For example, the thermal protection device 400 may be a polymer positive temperature coefficient (PTC) device (formed by dispersing conductive particles (such as metal particles or carbon particles) into a crystalline polymer), a fuse, a current interrupting element, and/or a bimetal element.

The thermal protection device 400 may include metal pieces 410 on both sides thereof. One of the metal pieces 410 disposed on a side of the thermal protection device 400 may be attached to the second lead terminal 322 by a method such as welding, and the other of the metal pieces 410 disposed on the other side of the thermal protection device 400 may be attached to the second electrode terminal 240 by a method such as welding.

The connection part 330 may be concealed between the first upper surface 120u and the second upper surface 220u and may electrically connect the first and second rechargeable batteries 100 and 200. The connection part 330 may include: a first part 332 coupled to the first electrode terminal 140 by a method such as welding; and a second part 334 coupled to the second contact part 233 by a method such as welding.

The connection part 330 is bent such that the first and second parts 332 and 334 may face each other. In this case, since the first and second parts 332 and 334 have the same voltage, it will be all right even though the first and second parts 332 and 334 are brought into contact with each other. As shown in FIG. 4, the connection part 330 may have a U-shape, and the first and second parts 332 and 334 may be overlapped with each other and brought into contact with each other.

In addition, the connection part 330 may include a bending region 336 between the first and second parts 332 and 334. For example, the bending region 336 may include or be a groove formed along a boundary between the first and second parts 332 and 334. The boundary of the first and second parts 332 and 334 may be defined in or at a center region of the bending region 336 and may be parallel with a length (or long) direction of the first upper surface 120u and the second upper surface 220u. The groove may be continuously or discontinuously formed in at least one of upper and lower surfaces of the connection part 330 along the boundary between the first and second parts 332 and 334.

As shown in FIG. 5, the rechargeable battery pack 10 may be easily assembled by disposing the first and second rechargeable batteries 100 and 200 with the first and second upper surfaces 120u and 220u facing in the same direction, attaching the connection part 330 to the first electrode terminal 140 and the second contact part 233, and unfolding the first and second rechargeable batteries 100 and 200 in directions shown by arrows.

The first and second rechargeable batteries 100 and 200 may be disposed in such a manner that the first and second contact parts 133 and 233 are opposite each other. Then, the first coverlay 310 may be connected to the first contact part 133, and the second coverlay 320 may be connected to the second electrode terminal 240. Therefore, the first and second coverlays 310 and 320 may extend outwardly in the same direction. The connection part 330 may be bent along the bending region 336.

As described above, the first and second rechargeable batteries 100 and 200 of the rechargeable battery pack 10 are electrically connected to each other through the connection part 330, and only the first and second coverlays 310 and 320 extend outwardly. Therefore, the first and second rechargeable batteries 100 and 200 may be simply connected, and a charge travel distance may be reduced or minimized. That is, the rechargeable battery pack 10 may have a compact structure.

Figure 6:
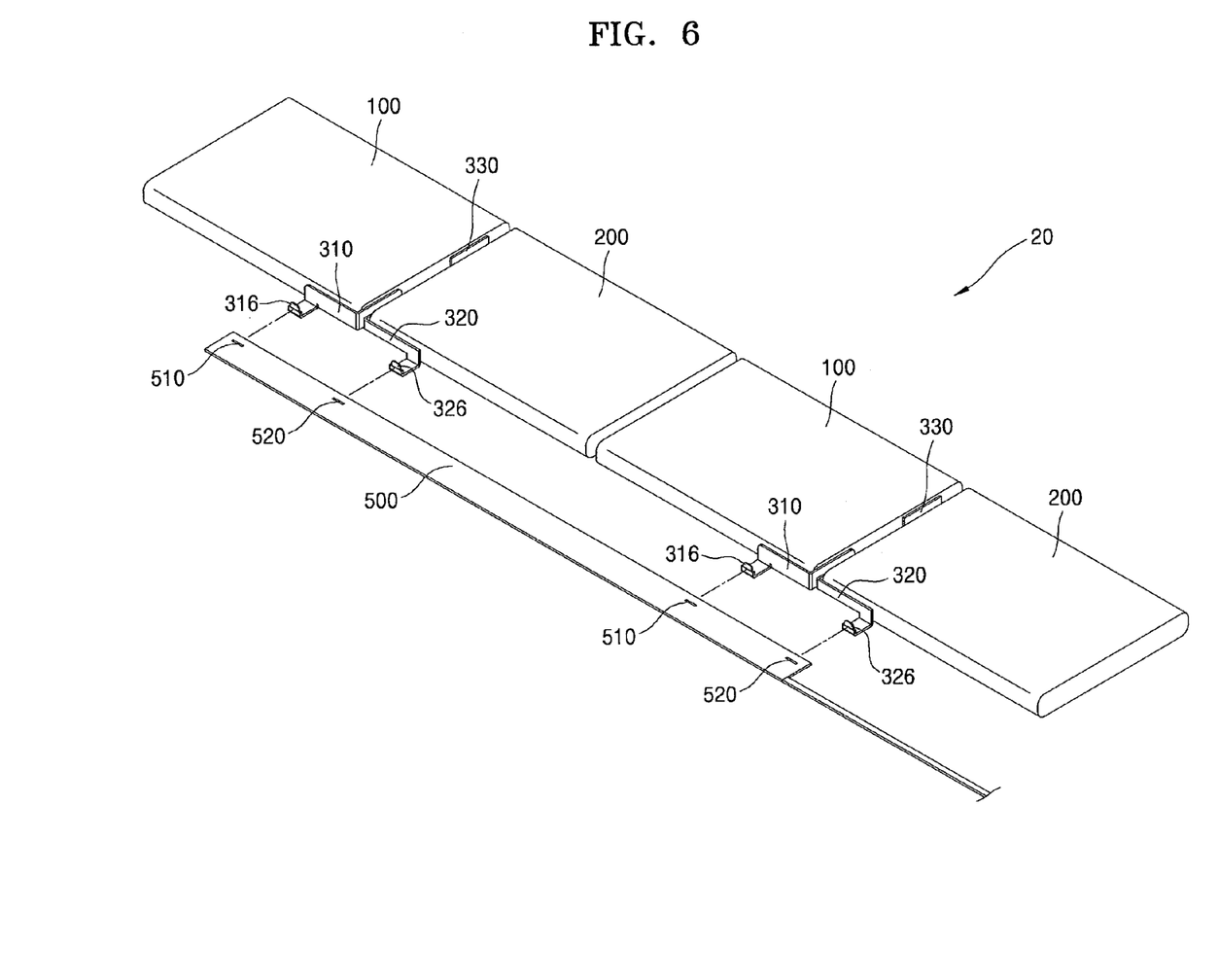
FIG. 6 illustrates a perspective view of a modification example of the rechargeable battery pack illustrated in FIG. 1.

FIG. 6 is a perspective view schematically illustrating a modification example of the rechargeable battery pack 10 illustrated in FIG. 1.

Referring to FIGS. 6 and 3, a rechargeable battery pack 20 may include first and second rechargeable batteries 100 and 200 arranged side by side in one direction, and a protective circuit module 500 electrically connected to the rechargeable batteries 100 and 200.

The first and second rechargeable batteries 100 and 200 of the rechargeable battery pack 10 illustrated in FIG. 3 may be repeatedly arranged at least once to form an array of the rechargeable batteries 100 and 200. That is, pairs of first and second rechargeable batteries 100 and 200 may be arranged such that first and second upper surfaces 120u and 220u of the first and second rechargeable batteries 100 and 200 may face each other, and connection parts 330 may be disposed between the first and second rechargeable batteries 100 and 200 to electrically connect the first and second rechargeable batteries 100 and 200. In addition, first coverlays 310 may be attached to the first rechargeable batteries 100, and second coverlays 320 may be attached to the second rechargeable batteries 200.

Each of the connection parts 330 may include: a first part 332 coupled to a first electrode terminal 140 by a method such as welding; and a second part 334 coupled to the second contact part 233 by a method such as welding. The connection parts 330 may be bent such that the first and second parts 332 and 334 may face each other and the connection parts 330 may not be exposed to the outside.

The first coverlays 310 may be electrically connected to the first rechargeable batteries 100, and first connection terminals 316 may protrude from ends of the first coverlays 310. Similarly, the second coverlays 320 may be electrically connected to the second rechargeable batteries 200, and second connection terminals 326 may protrude from ends of the second coverlays 320. The first and second coverlays 310 and 320 may extend outwardly in the same direction and may be connected to the protective circuit module 500.

The protective circuit module 500 may include first and second terminal holes 510 and 520 to receive the first and second connection terminals 316 and 326, and the protective circuit module 500 may be parallel with first lateral surfaces 120s on which first extensions 314 are disposed and second lateral surfaces on which second extensions 324 are disposed.

The protective circuit module 500 may prevent overheating and explosions caused by overcharging, overdischarging, or an overcurrent of the rechargeable batteries 100 and 200. The protective circuit module 500 may include a safety device constituted by passive devices such as resistors and condensers or active devices such as field-effect transistors, or the protective circuit module 500 may include a protective device including integrated circuits.

As described above, the first and second rechargeable batteries 100 and 200 of the rechargeable battery pack 20 are electrically connected to each other through the connection parts 330, and only the first and second coverlays 310 and 320 extend outwardly. Therefore, the first and second rechargeable batteries 100 and 200 may be simply connected, and the first and second connection terminals 316 and 326 may be minimally separated from each other. Therefore, the protective circuit module 500 may have a small size, and the rechargeable battery pack 20 may have a slim shape.

In the exemplary embodiment shown in FIG. 6, two first rechargeable batteries 100 and two second rechargeable batteries 200 are illustrated. However, the exemplary embodiments of the present disclosure are not limited thereto. For example, the first rechargeable batteries 100 or the second rechargeable batteries 200 may be odd-numbered. For example, three first rechargeable batteries 100 and two second rechargeable batteries 200 may be included in the rechargeable battery pack 20. In this case, a connection part 330 attached to a first rechargeable battery 100 not paired with any one of the second rechargeable batteries 200 may be connected to the protective circuit module 500 through an additional lead wire.

As described above, according to the one or more of the above exemplary embodiments, the rechargeable batteries of the rechargeable battery pack may be simply connected.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims, and equivalents thereof.

What is claimed is:

1. A rechargeable battery pack comprising:
    a first rechargeable battery comprising a first electrode terminal having a first polarity and a first contact part having a second polarity opposite the first polarity, the first electrode terminal and the first contact part being on a first upper surface of the first rechargeable battery;
    a second rechargeable battery comprising a second electrode terminal having the first polarity and a second contact part having the second polarity, the second electrode terminal and the second contact part being on a second upper surface of the second rechargeable battery;
    a first coverlay connected to the first contact part;
    a second coverlay connected to the second electrode terminal; and
    a connection part connecting the first electrode terminal and the second contact part,
    wherein the connection part comprises a first part connected to the first electrode terminal and a second part connected to the second contact part,
    the first upper surface of the first rechargeable battery and the second upper surface of the second rechargeable battery face each other,
    the connection part is bent such that the first and second parts face each other, and
    wherein the first coverlay and the second coverlay extend outwardly in a same direction, between the first upper surface and the second upper surface, and
    a portion of the first coverlay and a portion of the second coverlay are coated with an insulation film.

2. The rechargeable battery pack of claim 1, wherein the connection part comprises a bending region along a boundary between the first and second parts.

3. The rechargeable battery pack of claim 2, wherein the bending region comprises a groove formed along the boundary between the first and second parts.

4. The rechargeable battery pack of claim 1, wherein each of the first and second rechargeable batteries comprises:
    an electrode assembly comprising a first electrode plate, a second electrode plate, and a separator between the first and second electrode plates;
    a can accommodating the electrode assembly and having an opening formed in a side thereof; and
    a cap plate sealing the opening of the can, and
    wherein the cap plate forms the first or second upper surface.

5. The rechargeable battery pack of claim 4, wherein a piece of insulation tape is attached to the cap plate in such a manner that the first or second contact part is exposed.

6. The rechargeable battery pack of claim 4, wherein the first rechargeable battery comprises a pair of first main surfaces and a pair of first lateral surfaces that are substantially perpendicular to the first upper surface, the pair of first main surfaces are substantially parallel to each other, areas of the pair of first lateral surfaces are smaller than areas of the pair of first main surfaces, and the pair of first lateral surfaces connect the pair of first main surfaces, and the second rechargeable battery comprises a pair of second main surfaces and a pair of second lateral surfaces that are substantially perpendicular to the second upper surface, the pair of second main surfaces are substantially parallel to each other, areas of the pair of second lateral surfaces are smaller than areas of the pair of second main surfaces, and the pair of second lateral surfaces connect the pair of second main surfaces.

7. The rechargeable battery pack of claim 6, wherein the first coverlay comprises a first lead terminal disposed on the first upper surface and a first extension bent at a right angle from the first lead terminal and disposed on one of the pair of first lateral surfaces, and the second coverlay comprises a second lead terminal disposed on the second upper surface and a second extension bent at a right angle from the second lead terminal and disposed on one of the pair of second lateral surfaces.

8. The rechargeable battery pack of claim 7, wherein a first connection terminal protrudes from the first extension, and a second connection terminal protrudes from the second extension.

9. The rechargeable battery pack of claim 8, further comprising a protective circuit module connected to the first connection terminal and the second connection terminal, wherein the protective circuit module is substantially parallel with the pair of first lateral surfaces and the pair of second lateral surfaces.

10. The rechargeable battery pack of claim 7, wherein the second electrode terminal and the second lead terminal are electrically connected to each other through a thermal protection device.

11. A rechargeable battery pack comprising:
a first rechargeable battery comprising a first electrode terminal having a first polarity and a first contact part having a second polarity opposite the first polarity, the first electrode terminal and the first contact part being on a first upper surface of the first rechargeable battery;
a second rechargeable battery comprising a second electrode terminal having the first polarity and a second contact part having the second polarity, the second electrode terminal and the second contact part being on a second upper surface of the second rechargeable battery;
a first coverlay connected to the first contact part;
a second coverlay connected to the second electrode terminal;
a connection part connecting the first electrode terminal and the second contact part; and
a protective circuit module connected to the first coverlay and the second coverlay,
wherein the connection part comprises first and second parts and a bending region along a boundary between the first and second parts, the bending region being formed in a direction substantially parallel to a length direction of the first and second upper surfaces, and wherein the first coverlay and the second coverlay extend outwardly in a same direction, between the first upper surface and the second upper surface, and
a portion of the first coverlay and a portion of the second coverlay are coated with an insulation film.

12. The rechargeable battery of claim 11, wherein
the first part is connected to the first electrode terminal and the second part is connected to the second contact part, and the connection part is bent along the bending region such that the first and second parts face each other.

13. The rechargeable battery pack of claim 11, wherein each of the first and second rechargeable batteries comprises:
an electrode assembly comprising a first electrode plate, a second electrode plate, and a separator between the first and second electrode plates;
a can accommodating the electrode assembly and having an opening formed in a side thereof; and
a cap plate sealing the opening of the can,
wherein the cap plate forms the first or second upper surface.

14. The rechargeable battery pack of claim 13, wherein the first rechargeable battery comprises a pair of first main surfaces and a pair of first lateral surfaces that are substantially perpendicular to the first upper surface, the pair of first main surfaces are substantially parallel to each other, areas of the pair of first lateral surfaces are smaller than areas of the pair of first main surfaces, and the pair of first lateral surfaces connect the pair of first main surfaces, wherein the first coverlay comprises a first lead terminal disposed on the first upper surface and a first extension bent at a right angle from the first lead terminal and disposed on one of the pair of first lateral surfaces.

15. The rechargeable battery pack of claim 14, wherein the second rechargeable battery comprises a pair of second main surfaces and a pair of second lateral surfaces that are substantially perpendicular to the second upper surface, the pair of second main surfaces are substantially parallel to each other, areas of the pair of second lateral surfaces are smaller than areas of the pair of second main surfaces, and the pair of second lateral surfaces connect the pair of second main surfaces, wherein the second coverlay comprises a second lead terminal disposed on the second upper surface and a second extension bent at a right angle from the second lead terminal and disposed on one of the pair of second lateral surfaces.

16. The rechargeable battery pack of claim 15, wherein a first connection terminal protrudes from the first extension, and a second connection terminal protrudes from the second extension, wherein the protective circuit module is connected to the first connection terminal and the second connection terminal.

17. The rechargeable battery pack of claim 15, wherein the second electrode terminal and the second lead terminal are electrically connected to each other through a thermal protection device.

18. The rechargeable battery pack of claim 15, wherein the first upper surface of the first rechargeable battery and the second upper surface of the second rechargeable battery face each other, and the protective circuit module is substantially parallel with the pair of first lateral surfaces and the pair of second lateral surfaces.

* * * * *